UNITED STATES PATENT OFFICE.

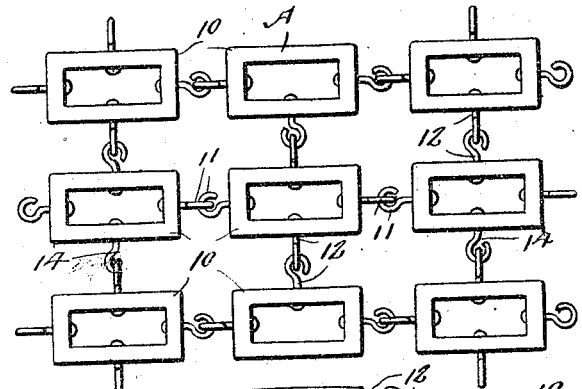
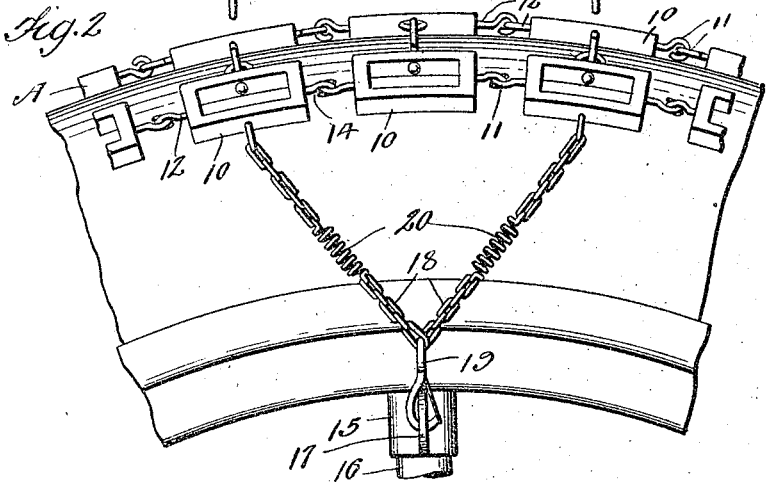
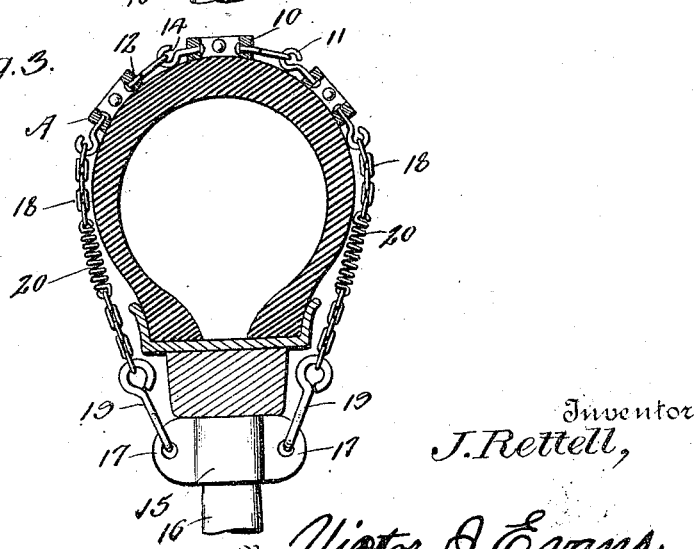

JOSEPH RETTELL, OF DETROIT, MICHIGAN.

ANTISKID-MAT.

1,267,269.   Specification of Letters Patent.   Patented May 21, 1918.

Application filed December 1, 1917.   Serial No. 204,899.

*To all whom it may concern:*

Be it known that I, JOSEPH RETTELL, a citizen of the United States, residing at Detroit, in the county of Wayne and State of Michigan, have invented new and useful Improvements in Antiskid-Mats, of which the following is a specification.

This invention comprehends the provision of an anti-skid mat for vehicle tires, which is simple in construction, and designed to effectively prevent skidding of the machine in any direction.

The invention further embodies a novel construction of means for securing the mat associated with the tire, the said means permitting the mat to be quickly applied to or removed from the tire as the occasion may require.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views and wherein:—

Fig. 1 is a plan view of a portion of the mat.

Fig. 2 is a fragmentary side elevation of a tire and wheel showing the mat positioned thereon.

Fig. 3 is a transverse sectional view through the tire and felly of the wheels showing the mat positioned thereon.

Referring more particularly to the drawing, the mat forming the subject matter of my invention is indicated generally at A, and is made up of a plurality of elongated rectangular shaped gripping elements 10. These elements are equidistantly spaced and arranged in transversely and longitudinally disposed rows. While any suitable means may be employed for connecting the gripping elements together in the production of the mat, use is preferably made of eye elements 11 including shanks 12 which latter have a swivel connection with the opposed sides and ends of each gripping element in a manner whereby the eye portion of the connecting means is disposed exteriorly of and about all sides of said element. The eye portions are open as at 14 to permit the eye members of the adjacent elements to be quickly and easily associated, or disengaged with a view of varying the size of the mat for different size tires, as well as permitting any of the gripping elements to be separated from the mat to be repaired if necessary. The swivel connection between the eye members and the gripping elements permit the latter to rest flat against the tread of the tire, and at the same time move with relation thereto to accommodate themselves to the irregularities of the surface, thus permitting the gripping elements to assume a position when in use to effectively prohibit skidding of the machine in any direction.

The mat may be secured upon the tire in any suitable manner, but as shown in this specific instance a band or ring 15 embraces one of the spokes 16 of the wheel, and projecting from diametrically opposite points from the ring or band, are apertured lugs 17 disposed at either side of the wheel. One of these bands is secured to the spokes at spaced intervals about the wheel, and depending from the opposite longitudinal edges of the mat for each of said bands is a pair of divergently disposed chains 18. The chains have their lowermost extremities connected by means of a snap hook or the like 19, which when engaged with the lugs 17 serve to maintain the mat properly positioned upon the tire. With a view of holding the mat reasonably taut about the tire, coil springs 20 are disposed within the length of the chains 19, constituting a part of the latter.

While it is believed that from the foregoing description the nature and advantages of the invention will be readily apparent, I desire to have it understood that what is herein shown and described is merely illustrative of the preferred embodiment of the invention, to which I do not limit myself, and that such changes may be resorted to when desired as fall within the scope of what is claimed.

What is claimed is:—

An anti-skid mat for tires comprising equidistantly spaced longitudinally and transversely disposed rows of elongated rectangular shaped gripping elements, eye members projecting from the sides and ends of each of said members, and the adjacent eye members being inter-connected as and for the purpose specified.

In testimony whereof I affix my signature.

JOSEPH RETTELL.